July 9, 1929.  F. J. BOWEN, JR., ET AL  1,720,260
VENDING AND SERVE SELF STORE VEHICLE
Filed March 15, 1928
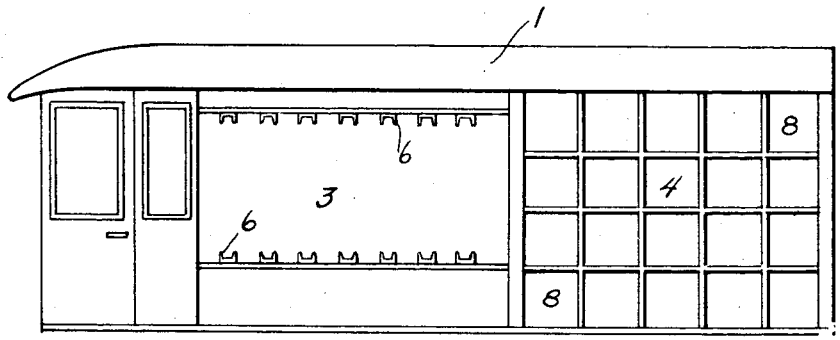
Fig. 1.
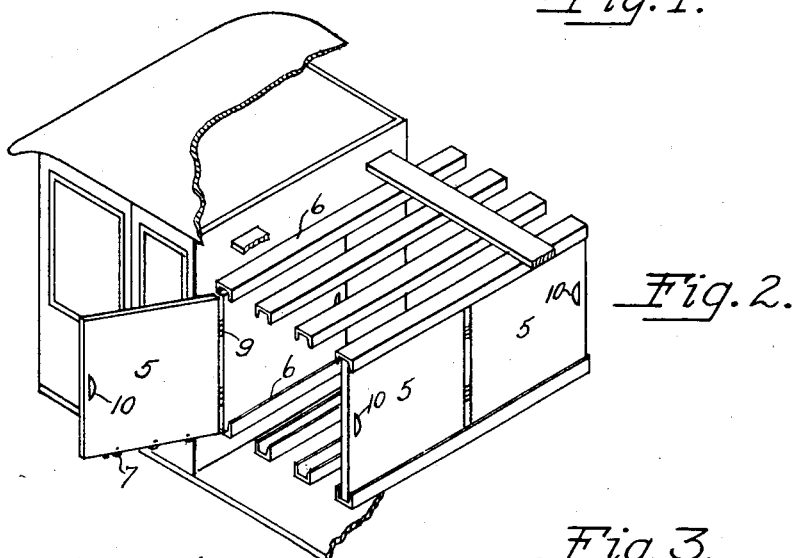
Fig. 2.
Fig. 4.  Fig. 3.
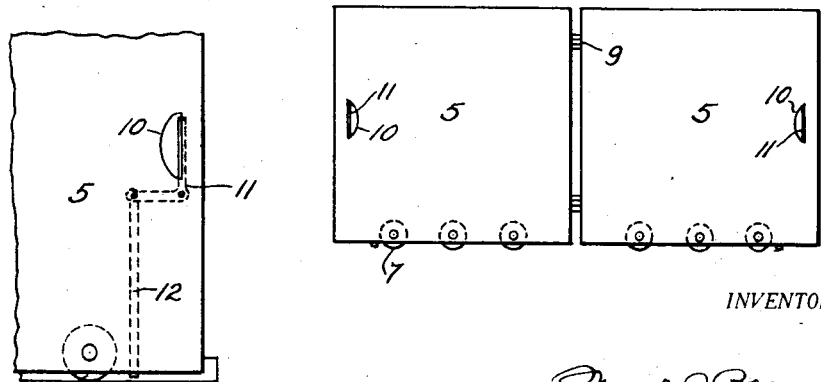
Witnesses:
INVENTORS, Patented July 9, 1929.

1,720,260

UNITED STATES PATENT OFFICE.

FRANCIS J. BOWEN, JR., AND JOHN G. BOWEN, OF SAN ANTONIO, TEXAS.

VENDING AND SERVE-SELF STORE VEHICLE.

Application filed March 15, 1928. Serial No. 261,969.

Our invention relates to new and useful improvements in vending and serve-self store vehicles for carrying conveniently a variety of articles, including automotive and electrical auto accessories and parts, radio supplies, and such like commodities, for display and sale, and in such connection it may properly be termed a traveling store.

The primary and most important object of our invention is to provide a vending and serve-self store vehicle adapted to transport a variety of articles and so arranged that a customer may readily purchase whatever is desired, the articles for sale being suitably kept and displayed by means of panels, which may be made of wood, metal, or any suitable material, such panels being either of a rigid construction or consisting of two pieces hinged together about midway so that they can be more conveniently drawn out.

A further object is to provide an efficient vending and serve-self store vehicle wherein the goods are supported and arranged to display more efficiently and conveniently a variety of articles in view of the limitations of space.

A further object is to so construct the panels that the goods may be attached on both the front and back sides thereof giving a greater display surface.

A further object is to provide movable panels to display merchandise of a great variety of classes and brands of goods, and a plurality of bins in the same vehicle so that as the articles displayed are purchased and removed from the panels, they may be readily replenished from the additional supply carried in the bins.

A further object is to provide movable panels for the body of the vehicle whereby said panels may be readily moved to a position of vantage to be viewed from the exterior of the vehicle.

Other objects and features will become apparent as the description of the invention progresses.

In the accompanying drawings forming a part of this specification is illustrated the preferred embodiment of the invention capable of carrying the same into practical operation, it being understood that the invention is not necessarily limited thereto, as various changes in shape, proportions, and general assemblage of the parts may be resorted to without departing from the principle of the invention or sacrificing any of its advantages.

Fig. 1 of the drawings is a side elevation of a vehicle body, the doors comprising the sides of the outer shell having been removed. Fig. 2 is a fragmentary sectional view of the side of the vehcile showing a panel in place within the body of the vehicle and one of the panels withdrawn from the body of the vehicle. Fig. 3 is a front elevational view of the panel. Fig. 4 is a front elevation of a fragmentary section of a panel also, showing a section of a partition of the track and latch for holding the panel within the body of the vehicle.

Referring to the drawings, 1 designates a specially designed automobile body which may be mounted on the chassis of any well known truck. The sides of the outer shell may be in the form of doors which are detachably hinged or fitted in place and may be readily removed out of the way, disclosing two sections 3 and 4 as shown in Fig. 1. Section 3 contains a series of removable panels 5 transversely placed in the body 1 and slidably mounted on individual channel guide tracks 6 riveted or bolted to the top and bottom of the body frame, in which channel guide tracks 6 panels 5 move and which channel guide tracks 6 hold panels 5 in vertical position. Panels are fitted at the bottom with rollers 7 that carry the weight of the sliding panel and the merchandise thereon, these rollers 7 running in the bottom channel guide track 6. Section 4 contains a plurality of bins 8 for the transportation of merchandise and to replenish supplies on the panels.

Panels 5 are vertically divided about midway and pivotally hinged at 9. Such panels may be partially or entirely withdrawn by means of hand holds 10 on either side of the vehicle body through the open sides. When such panel 5 is partially withdrawn a sufficient distance, it may be swung laterally either to the right or to the left, exposing to view display surfaces on either side thereof, on which are conveniently displayed articles for ready sale such as are found in stores of the particular lines that it is desired to handle. Where automotive and electrical auto accessories and parts, radio supplies, and such like commodities are handled, hooks, clamps, racks, pockets, or other suitable means are provided to permit of the ready inspection and removal of the desired articles by customers or salesmen. Fig. 2 shows a panel in place within the body of the vehicle. In order to prevent the panels from sliding out sideways after the sides of the outer shell have been removed when the vehicle inclines to the side, suitable fastening means may be provided as shown in Fig. 4, which consists of a bell crank 11 pivotally mounted within the body of the panel 5, to which is loosely pivoted the bolt member 12 slidably mounted within a hole drilled in said panel.

As the goods in automotive and electrical auto accessory and radio supply stores are greatly varied, and as a great variety of classes and brands of goods are handled, it is necessary not only to provide for the sale of this great variety of classes and brands of each class, but also it is necessary to arrange them so that they may be readily distinguished and obtained. Furthermore, the moving of the store over the road ordinarily causes the scattering of the goods. By our invention we are enabled to provide a vending and serve-self store vehicle in which are combined facilities for transporting in good condition a large variety of articles and from which they may be conveniently reached and vended.

This store vehicle constitutes an exceedingly efficient concrete means whereby an exceedingly efficient service may be rendered to the public to its perfect convenience and great advantage.

Having described our invention, we claim:

A vending and serve-self store vehicle, consisting of a body, such body being provided with a series of removable rigid panels, slidably mounted and provided with rollers for movement on channel guide tracks situated at the top and bottom, each of the panels being provided with a hand hold near the outside edges thereof and being movable edgewise along the channel guide tracks a sufficient distance to be readily withdrawn, partially or entirely, on either side of the body through the open sides; and latching means limiting the movement and preventing the slipping out of the panels, said latching means being movable from operative to inoperative position upon grasping of the handhold of any of the panels.

In testimony whereof, we have hereunto set our names this 12th day of March, 1928.

FRANCIS J. BOWEN, Junior.
JOHN G. BOWEN.